Figure 1:
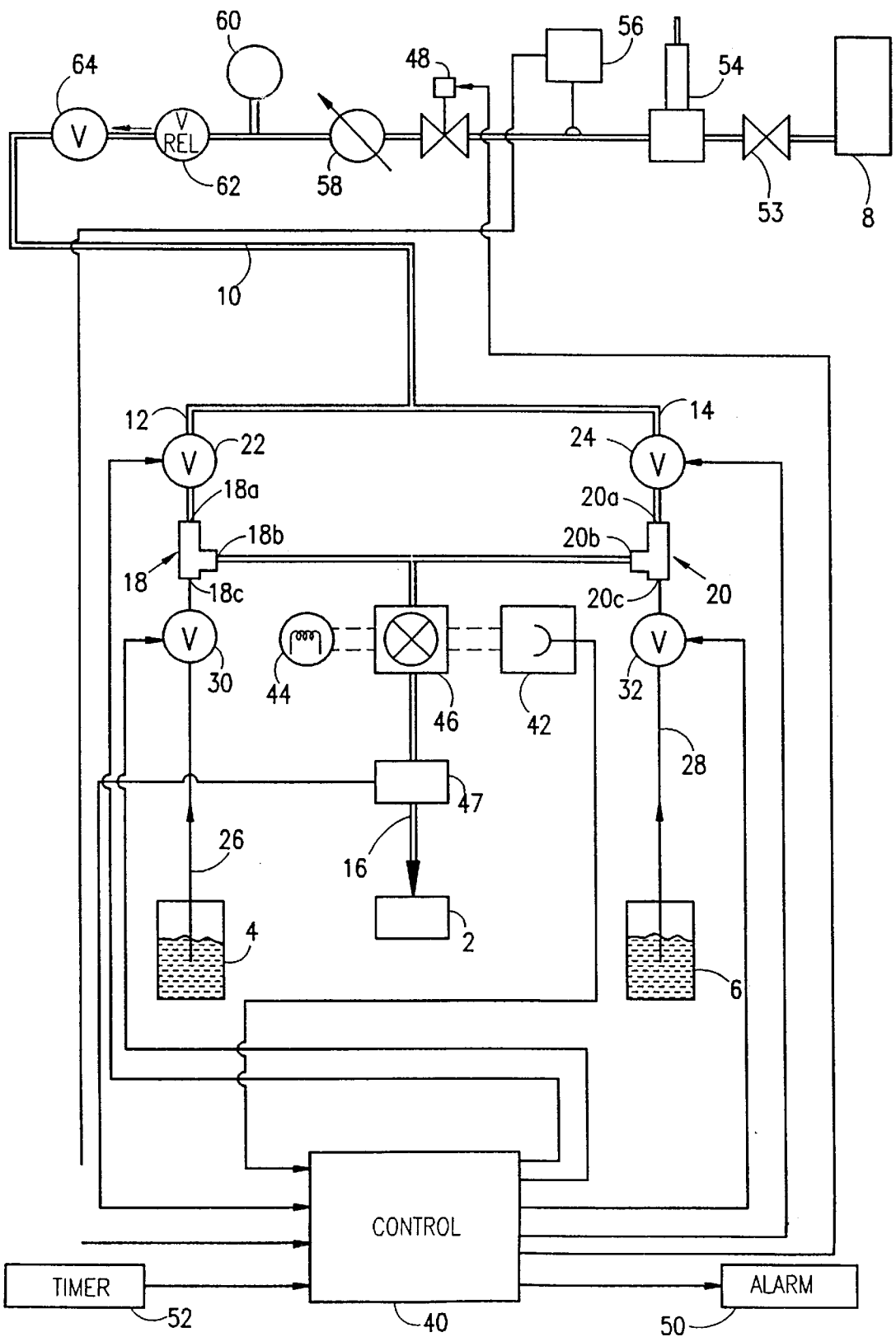

United States Patent [19]
Barak

[11] Patent Number: 5,976,386
[45] Date of Patent: Nov. 2, 1999

[54] METHOD AND APPARATUS FOR TREATING LIQUIDS TO INHIBIT GROWTH OF LIVING ORGANISMS

[75] Inventor: Ayala Barak, Tel Aviv, Israel

[73] Assignee: A.Y. Laboratories Ltd., Tel Aviv, Israel

[21] Appl. No.: 08/809,346

[22] PCT Filed: Sep. 26, 1995

[86] PCT No.: PCT/US95/12322

§ 371 Date: Jun. 27, 1998

§ 102(e) Date: Jun. 27, 1998

[87] PCT Pub. No.: WO96/10541

PCT Pub. Date: Apr. 11, 1996

[30] Foreign Application Priority Data

Oct. 3, 1994 [IL] Israel .......................................... 111150
Jun. 27, 1995 [IL] Israel .......................................... 114368

[51] Int. Cl.⁶ ........................................................ C02F 1/76
[52] U.S. Cl. .......................... 210/756; 210/743; 210/745; 210/754; 210/755; 210/758; 210/764; 210/96.1; 210/101; 210/192; 210/198.1; 422/29; 422/37; 422/256
[58] Field of Search .................................... 210/743, 745, 210/754–756, 758, 764, 96.1, 101, 143, 192, 198.1, 205, 258; 422/28, 29, 37, 256

[56] References Cited

U.S. PATENT DOCUMENTS

| | | | |
|---|---|---|---|
| 3,222,276 | 12/1965 | Belohlav et al. | 210/754 |
| 3,322,276 | 5/1967 | Riede et al. | 209/158 |
| 3,328,294 | 6/1967 | Self et al. | 210/755 |
| 3,799,396 | 3/1974 | Ashmead et al. | 222/1 |
| 3,975,271 | 8/1976 | Saunier et al. | 210/62 |
| 4,137,166 | 1/1979 | Heimberger et al. | 210/62 |
| 4,300,909 | 11/1981 | Krumhansl | 23/230 |
| 4,872,999 | 10/1989 | Schild et al. | 210/754 |

FOREIGN PATENT DOCUMENTS

| | | |
|---|---|---|
| 403465 | 6/1990 | European Pat. Off. . |
| 517102 | 5/1992 | European Pat. Off. . |
| 1600289 | 8/1977 | United Kingdom . |

OTHER PUBLICATIONS

Standard Methods for the Examination of Water & Waste Water, 16th. Edition, Methods, Sec. 409, pp. 316–319.

The NalCO Water Handbook, p. 22.9.

Mark D. Sobsey, et al., Inactivation of Hepatitis A Virus and Model Viruses in Water by Free Chlorine and Monochloramine, Great Lakes Chem. Corp. Wat. Sci. Tech. 20, No. 11/12, pp. 385–391, 1988.

J. Beck, et al., Preformed Monochloramine Used As A Post–Disinfectant in Drinking Water Treatment . . . , Aqua, No. 1, pp. 25–33, 1986.

G. Holzwarth, et al., The Fate of Chlorine and Chloramines in Cooling Towers, Water Res. vol. 18(1), pp. 1421–1427, 1984.

Lynn E. Applegate, et al., New Chloramine Process to Control Aftergrowth . . . Desalination 74, Elsevier Science Publishers B.V., Amsterdam, pp .51–67, 1989.

Atasi Khalil Z., et al., Disinfection Aid . . . Proc. Ann. Conf. Am. Water Works Assoc., 1988 (Part 2), pp. 1763–1770.

(List continued on next page.)

Primary Examiner—Peter A. Hruskoci
Attorney, Agent, or Firm—Ladas & Parry

[57] ABSTRACT

A method and apparatus for treating a liquid to inhibit growth of living organisms therein by adding to the liquid an active biocidal ingredient formed by mixing an oxidant and an amine source, by: producing a predetermined dilution of the oxidant; producing a predetermined dilution of the amine source; synchronously metering the two dilutions into a conduit to continuously mix therein according to a predetermined ratio to produce the active biocidal ingredient having high reproducibility, stability and efficacy in situ in the conduit; and continuously injecting the active biocidal ingredient, as it is produced in situ in the conduit, directly from the conduit into the liquid being treated.

32 Claims, 2 Drawing Sheets

OTHER PUBLICATIONS

World Patents Index, Section Ch. Week 7704, Derwent Publications Ltd., London, GB; Class C, AN 77–07043Y & SU–A–72, 747 861 (Leno Food), Jan. 31, 1972, abstract.

World Patents Index, Section Ch. Week 8006, Derwent Publications Ltd., London GB; Class C, AN 80–09979C & JP–A–54, 161 592 (Mitsubishi Gas Chem. Industry), Dec. 21, 1979, abstract.

World Patents Index, Section Ch. Week 7340, Derwent Publications Ltd., London, GB; Class C; AN 73–59227U & SU–A–365 150 (Veterinary Sanitation), abstract.

METHOD AND APPARATUS FOR TREATING LIQUIDS TO INHIBIT GROWTH OF LIVING ORGANISMS

This application is a 371 of PCT/U.S. Ser. No. 95/12322 file Sep. 26, 1995.

The present invention relates to a method of treating a liquid to inhibit the growth of living organisms. The invention is particularly useful to prevent biological fouling of circulating water, and is therefore described below with respect to that application, but it will be appreciated that the invention could be used in other applications as well.

As described in published European Patent Application No. 92109015.5, published Sep. 12, 1992 (corresponding to Israel Patent Application 98352 filed Aug. 3, 1991), biological fouling of circulating water is a well known problem caused by algae, fungi, bacteria, and other simple life forms found in circulating water. That patent publication describes controlling biofouling in high chlorine demand waters by mixing two components, one of which is an oxidant and the other an ammonium salt, and adding the mixture substantially immediately to the aqueous system to be treated. This produces the active biocidal ingredient, as described therein. A large number of examples of oxidants and ammonium salts are described in that patent publication, and the contents of that patent publication are therefore incorporated herein by reference.

A problem encountered in this method of treating liquid to inhibit growth of living organisms, however, is that the concentrated active biocidal ingredient is extremely non-stable chemically and quickly decomposes upon formation with the result that there is a fast drop in pH. This is especially so for the active biocidal ingredients derived from ammonium bromide where the decomposition results in the undesirable formation of HOBr. Therefore, when conventional dosing pumps and mixers are used, the formed active biocidal ingredient quickly decomposes and loses its efficacy. Also, while the pH range of such concentrated active biocide is theoretically 8.0–12.5, actually the pH never exceeds 8.0 because of the fast decomposition. In addition, the ammonium salts must be supplied in excess in order to decrease the decomposition rate.

An object of the present invention is to provide a method and apparatus of the foregoing type but having advantages in the above respects.

According to one aspect of the present invention, there is provided a method of treating a liquid to inhibit growth of living organisms therein by adding to the liquid an active biocidal ingredient formed by mixing an oxidant and an amine source, comprising producing a predetermined dilution of the oxidant; producing a predetermined dilution of the amine source; synchronously metering the two dilutions into a conduit to continuously mix therein according to a predetermined ratio to produce said active biocidal ingredient having high reproducibility, stability and efficacy in situ in the conduit; and continuously injecting the active biocidal ingredient, as it is produced in situ in the conduit, directly from the conduit into the liquid being treated.

By "synchronously metering" the two dilutions, it is meant metering the amine source and the oxidant to the two water streams in a manner having the same time and molar relation and then metering the two dilutions in a manner also having the same time and molar relation. In further examples described below, the synchronous metering is effected by venturi pumps but could also be effected in other manners, such as by peristaltic pumps and pulsatile pumps operating with the same time and displacement relationship.

According to another aspect of the invention, there is provided a method of treating a liquid to inhibit growth of living organisms therein by adding to the liquid an active biocidal ingredient formed by mixing an oxidant and an amine source, characterized in continuously and synchronously injecting a quantity of the oxidant into a first stream of water passing through a first conduit to produce therein a predetermined dilution of the oxidant; continuously and synchronously injecting a quantity of the amine source into a second stream of water passing through a second conduit to produce therein a predetermined dilution of the amine source; continuously and synchronously injecting the first and second streams into a third conduit according to a predetermined ratio to produce the active biocidal ingredient in situ in the third conduit; and continuously injecting the active biocidal ingredient, as it is produced in situ in the third conduit, from the third conduit into the liquid being treated.

According to further features in the described preferred embodiments, the oxidant is continuously injected into the first stream of water by a first dosing pump conducting the first stream of water through the first conduit and connected to a reservoir of the oxidant. The amine source is also continuously injected into the second stream of water by a second dosing pump, synchronously operated with the first dosing pump, conducting the second stream of water through the second conduit and connected to a reservoir of the amine source. Both dosing pumps are preferably venturi tubes, peristaltic pumps, high-frequency, low-displacement pulsatile pumps, or the like.

As will be described more particularly below, using two synchronously operated dosing pumps to produce a predetermined dilution of the two reactants before mixing them together, and immediately mixing them together to produce the active biocidal ingredient in situ just as it is being added to the liquid being treated, were surprisingly found to greatly increase the reproducibility, stability and efficacy of the active ingredient (demonstrated by the stable pH of the concentrated active biocidal ingredient), as compared to the prior art methods where the two reactants are merely mixed together and added to the liquid being treated as described in the above cited European Patent Application No. 92109015.5.

Preferably, the concentrated active biocidal ingredient, as produced in situ, should have a pH of at least 7.0, more preferably over 9.0, before being injected into the liquid being treated. The liquid being treated should preferably have a pH of 5–10.5, more preferably 7–9. The active biocidal ingredient produced in situ is injected into the liquid being treated preferably to a concentration of 0.5–300 ppm, more preferably 3–10 ppm, expressed as chlorine.

The amine source may be selected from an oxidizable nitrogen derivative, preferably from the group of ammonium salts, organic amines, sulfamic acid, hydrazine, dimethylhydantoin, and cyanuric acid benzotriazole, hexamethylene diamine, ethylenediamine, ethanolamine, or mixtures thereof. The amine source may contain a detergent, surfactant, water treatment chemicals, color, and/or a base, e.g. NaOH or $NH_3OH$. Preferably, it has a concentration of 0.1–50%, more preferably 2.5–30%, and could be equimolar to $Cl_2$. The diluted amine source preferably has a concentration of 0.1–6.0% and is equimolar to $Cl_2$.

The oxidant is preferably selected from the group of sodium hypochlorite and calcium hypochlorite. It may, however, be a solution of chlorine, in which case the amine source should be a solution containing an excess base corresponding to at least 10% NaOH. Preferably, the oxidant has a concentration of 0.3–15%, more preferably 5–15%, expressed as $Cl_2$.

The diluted oxidant preferably has a concentration of 0.1%–2.0%, expressed as $Cl_2$.

The invention also provides apparatus for treating a liquid to inhibit growth of living organisms therein according to the above-described method.

The novel method and apparatus enable the constant ratio of oxidant/amine source to be maintained, thereby avoiding the need to use excess amine source in order to stabilize the reaction product and to maintain a reproducible product containing almost no degradation products. In addition, the novel method produces an efficient in situ dilution of both the oxidant and the amine source, thereby avoiding the need for pre-dilution of the respective ingredients in water, storing in large tanks, etc.

The above-described efficient method for producing an active biocidal ingredient allows a comparison to be made between efficacies exhibited by active biocidal ingredients derived from various amine sources and ammonium salts. Such a comparison shows that an active biocidal ingredient derived from ammonium bromide exhibits superior efficacy and faster rate of kill in basic media as compared to active biocidal ingredients derived from other amine sources; and that for treating acidic media, the active biocidal ingredient derived from ammonium carbonate exhibits superior efficacy.

Further features and advantages of the invention will be apparent from the description below.

Figure 2:
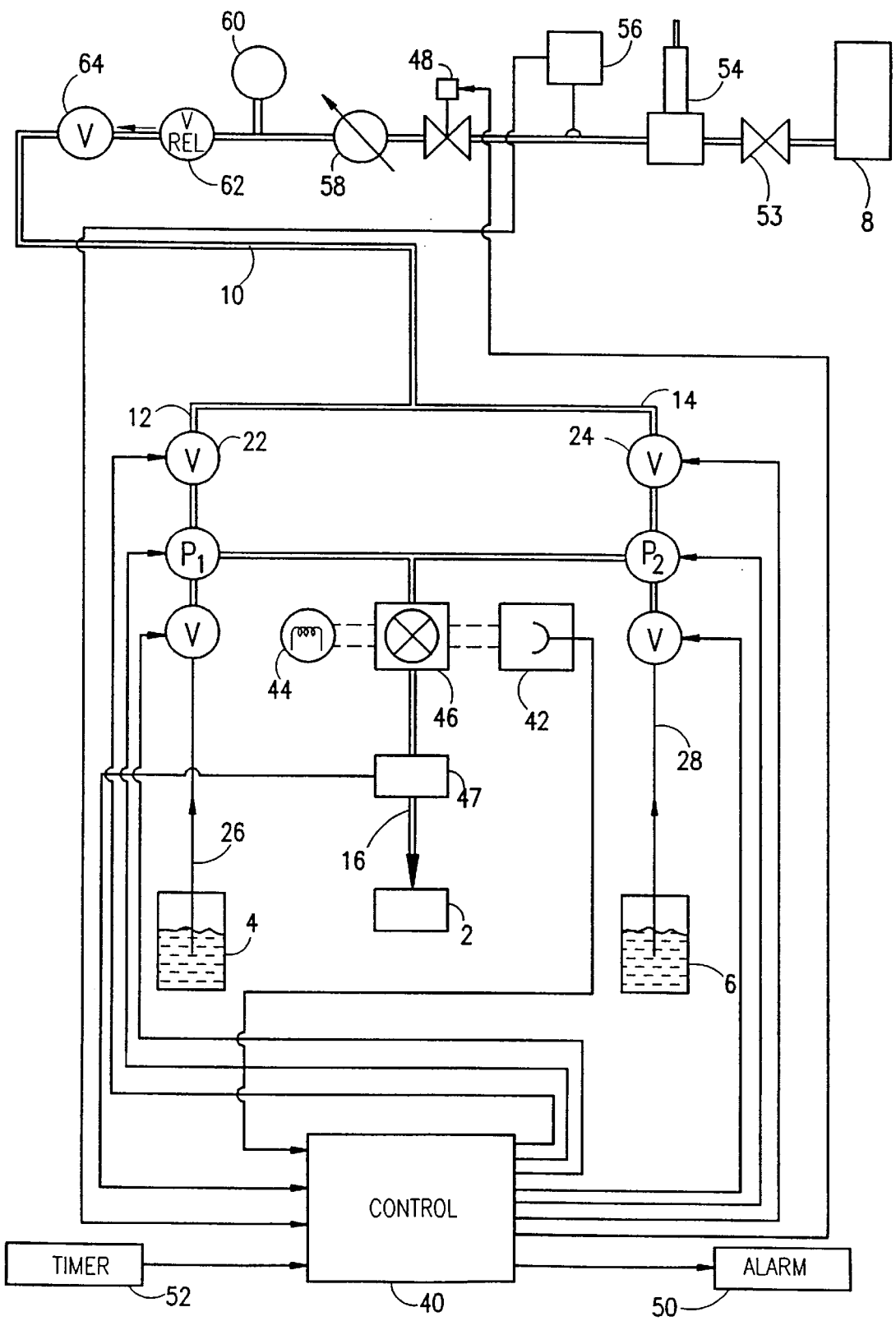

The invention is more particularly described with respect to a number of examples set forth below, and also with respect to the accompanying drawing wherein:

FIG. 1 is a block diagram illustrating one form of apparatus constructed in accordance with the present invention; and FIG. 2 is a similar block diagram illustrating another apparatus in accordance with the present invention.

The apparatus illustrated in FIG. 1 is intended to treat a liquid, such as water in a cooling tower, waste water, or the like, used at a location, schematically indicated at 2 in the drawing, to disinfect that liquid or otherwise to inhibit growth of living organisms in that liquid. This is done by adding to the liquid at location 2 an active biocidal ingredient formed by mixing in situ two solutions, namely an oxidant solution within a reservoir 4, and an amine source solution within a reservoir 6.

As shown in the drawing, water, e.g., tap water is fed from a source 8 via a water pipe 10 through a pair of branch lines 12, 14, connected in parallel to each other, to a common outlet pipe 16 leading to the liquid to be treated at the location 2. Each of the two parallel branch lines 12, 14, includes a venturi tube 18, 20 having an inlet port 18a, 20a, connected in the respective branch line 12, 14, and an outlet port 18b, 20b, connected to the common outlet line 16 leading to the liquid to be disinfected. Each of the venturi tubes 18, 20, includes a third port 18c, 20c, leading to the reservoir 4, 6, of the respective solution to be added to the water flowing through the outlet line 16.

The two venturi tubes 18, 20, thus constitute dosing pumps which continuously and synchronously inject both oxidant solution from reservoir 4, and the amine source solution from reservoir 6, into the water from source 8 in the required predetermined proportions. These two chemicals continuously and instantaneously react with each other in the outlet pipe 16 so that the reaction product, namely the active biocidal ingredient produced by the reaction of these two chemicals, is immediately and continuously produced in situ as it is introduced into the liquid at the location 2 to be treated.

The two branch lines 12, 14 for the two venturi tubes 18, 20 include control valves 22, 24, which enable the flow rate of the water to be controlled via the two venturi tubes 18, 20. Lines 26, 28 connecting the two reservoirs 4, 6 to their respective venturi tubes 18, 20 also include valves, shown at 30, 32, for controlling the dosage of the chemicals into the water passing through the venturi tubes. The latter valves also enable the supply of chemicals to be terminated at the end of the introduction of the active biocidal ingredient, so that continued flow of the water via the branch lines 12, 14 and the outlet line 16 will wash away any residue of these chemicals, or their decomposition products, and thereby avoid accumulation of decomposition products which form at the end of each disinfection cycle in the outlet line 16.

The control of the foregoing valves is done by a control system, schematically illustrated by block 40. One of the inputs to control system 40 is a light sensor 42 which senses the light from a source 44 passing through a transparent window 46 in the outlet line 16. Thus, an optical property of the water passing through outlet line 16 can be used for continuously monitoring the relative dosage of the two chemicals from sources 4, 6, introduced into the water passing through the two venturi tubes 18, 20, and thereby into the liquid to be disinfected.

Where the amine source includes ammonium bromide, an orange color appears if the active biocidal ingredient decomposes. Light sensor 42, therefore, would include a filter making it particularly sensitive to the orange color.

The pH of the concentrated active ingredient decreases as the concentrated active biocidal ingredient decomposes. Outlet line 16, therefore, may also include a pH sensor 47 for sensing the pH of the concentrated active biocidal ingredient, and controlling the control system 40 in response thereto.

Control system 40 also controls the supply of the water from source 8 via an electrical valve 48. Control system 40 can further control an alarm 50 or other signalling device. The illustrated system may further include a timer 52 which is presettable to fix both the times, and the time intervals, during which the active biocidal ingredient is to be applied via the outlet line 16 to the liquid to be disinfected.

The water supply line 10 from the water source 8 to the two branch lines 12, 14, could include additional control devices. For purposes of illustration, the accompanying drawing schematically illustrates the following additional control devices: a manual control valve 53, enabling manual control of the water flow from the source 8; a pressure reducer 54 for reducing the pressure from the source; a pressure sensor 56 which may also be used as an input into the control system 40; a flow meter 58 for indicating the flow rate or flow volume; a pressure gauge 60 for indicating the pressure in line 10; a pressure relief valve 62; and a one-way valve 64.

Preferably, the two venturi tubes 18, 20, and their controls, are designed so as to synchronously feed the same volumes of solutions from the two sources 4, 6 even though the viscosities of the two solutions may be different. The illustrated system operates at a constant predetermined water pressure and at a constant ratio of predetermined dilution of the two solutions to the water passing via the branch lines 12, 14, through the two venturi tubes 18, 20. Each of these parameters can be controlled as described above so that the solutions from the two sources 4, 6, are simultaneously and synchronously injected in the desired predetermined proportions with respect to each other, and also with respect to the water flowing through the venturi tubes 18, 20 from the source 8.

As indicated earlier, the solution in reservoir 4 is an oxidant, and the solution within reservoir 6 is an amine source. Preferably, the latter is an ammonium salt containing a halide, sulfate, nitrate, carbonate, bromide, or mixtures of any of the ammonium salts, surfactants, detergents, etc., mentioned above. The oxidant is preferably sodium hypochlorite. The above-cited published patent application discloses a large number of examples which are generally useful also in the present invention. Below are described additional examples particularly useful with the apparatus illustrated in the drawing.

The concentrated active biocidal ingredient injected into the liquid should have a pH greater than 7.0, preferably greater than 9.0, and should be injected at a rate to maintain in the concentrated active biocidal ingredient a stable pH of at least 7.0. The active biocidal ingredient is normally very non-stable, and upon decomposition there is a sharp decrease in the pH. Accordingly, efficient production of the active biocidal ingredient maintains a stable pH of at least 7.0, preferably greater than 9.0. It delays the decomposition of this otherwise extremely non-stable product at least for 5 minutes and thereby prolongs its efficacy. Stability is maintained under these special dosing conditions even in the presence of a 15% excess of oxidant. (Mole ratio of amine source to chlorine of 1:1.15.)

As indicated earlier, the dosing pumps 18, 20, could be other forms of pumps. This is shown in FIG. 2, wherein the venturi pumps 18, 20 are replaced by dosing pumps $P_1$, $P_2$, which may be peristaltic pumps, pulsatile pumps, and the like. The two pumps $P_1$, $P_2$ are also controlled by the control system 40 so as to synchronously meter the liquids from the two reservoirs 4, 6, via feed lines 26, 28, in the same manner as the venturi pumps 18, 20, in the system described above with respect to FIG. 1. All the other elements of the system in FIG. 2 are the same as in FIG. 1 and operate in the same manner.

Following are more specific examples of the above-described method and the chemicals used for treating water to inhibit the growth of living organisms. These examples have been found particularly effective for inhibiting the growth of Legionella Pneumophila in cooling water. They also show that active biocidal ingredients derived from different amine sources exhibit different efficacies; and that an active biocidal ingredient derived from ammonium bromide exhibits superior efficacy, resulting in faster rate of kill as compared to those derived from other amine sources whenever the pH of the treated media is basic, while the active biocidal ingredient derived from ammonium carbonate exhibits superior efficacy in acidic media.

The concentrated solutions of the active biocidal ingredient of the following Examples 1–11 were prepared by using apparatus providing a continuous, synchronous production of the active biocidal ingredient in accordance with the above-described method. Examples 12–18 compare the "batch formations" in the method of the above-cited European Patent Application No. 92109015.5 with the continuous formations described in the present application. The "batch dilution factor" refers to the final dilution of both NaOCl and the ammonium source in the concentrated biocidal solution.

The decomposition rate of the concentrated active ingredient was monitored in the examples below by measuring the residue of combined chlorine in the concentrate.

EXAMPLE 1

A concentrated solution of the active biocidal ingredient was prepared from ammonium chloride (82.9 gr/L) and sodium hypochlorite (10% expressed as $Cl_2$). The rate of decomposition of the concentrated active ingredient was monitored with time as follows:

TABLE 1

| Time (Minute) | pH | Residual Oxidant expressed as ppm $Cl_2$ | $NH_4+$ ppm |
|---|---|---|---|
| 0 | 10.49 | 9200 | 2400 |
| 12 | 10.39 | 9600 | 2500 |
| 30 | 10.34 | 9500 | 2500 |
| 60 | 10.27 | 9200 | 2500 |
| 120 | 10.16 | 9000 | 2500 |

EXAMPLE 2

A concentrated solution of the active biocidal ingredient was prepared from ammonium bromide (152 gr/L) and sodium hypochlorite (10% expressed as $Cl_2$). The rate of decomposition of the concentrated active biocidal ingredient was monitored with time as follows:

TABLE 2

| Time (Minute) | pH | Residual Oxidant expressed as ppm $Cl_2$ | $NH_4+$ ppm |
|---|---|---|---|
| 0 | 10.55 | 7300 | 1900 |
| 11 | 10.08 | 6800 | 1900 |
| 22 | 9.56 | 6700 | 1800 |
| 43 | 2.02 | 1000 | 1100 |

Ammonium bromide decomposes much faster than other active ingredients derived from other ammonium salts.

EXAMPLE 3

A concentrated solution of the active biocidal ingredient was prepared from ammonium sulfate (102.5 gr/L) and sodium hypochlorite. The rate of decomposition of the concentrated active biocidal ingredient was monitored with time:

TABLE 3

| Time (Minute) | pH | Residual Oxidant expressed as ppm $Cl_2$ | $NH_4+$ |
|---|---|---|---|
| 0 | 11.0 | 9000 | 2300 |
| 14 | 10.98 | 10000 | 2400 |
| 38 | 10.88 | 8400 | 2400 |
| 150 | 10.48 | — | — |

EXAMPLE 4

A concentrated solution of the active biocidal ingredient was prepared from ammonium hydrogen phosphate (102.4 gr/L) and sodium hypochlorite. The rate of decomposition of the concentrated active biocidal ingredient was monitored with time as follows:

TABLE 4

| Time (Minute) | pH | Residual Oxidant expressed as ppm $Cl_2$ | $NH_4+$ |
|---|---|---|---|
| 0 | 9.70 | 8000 | 2000 |
| 8 | 9.64 | 8300 | 2100 |
| 26 | 9.56 | 8100 | 2100 |
| 80 | 9.39 | — | — |

EXAMPLE 5

A concentrated solution of the active biocidal ingredient was prepared from ammonium carbonate (74.4 gr/L) and sodium hypochlorite. The rate of decomposition of the concentrated active biocidal ingredient was monitored with time as follows:

TABLE 5

| Time (Minute) | pH | Residual Oxidant expressed as ppm $Cl_2$ | $NH_4+$ |
|---|---|---|---|
| 0 | 10.1 | 8000 | 2100 |
| 17 | 10.04 | 8000 | 2100 |
| 16h | 9.32 | 7500 | 1800 |
| 24h | 9.00 | 7000 | 1600 |

EXAMPLE 6

The efficacy of active biocidal ingredients derived from various ammonium salts against Bacillus in phosphate buffer, pH of the media 7.0 (initial count: $4 \times 10^6$ cfu/ml) was tested as follows:

TABLE 6

| Ammonium Salt | Dosage ppm expressed as $Cl_2$ | Viable Count cfu/ml after | | | | |
|---|---|---|---|---|---|---|
| | | 1 min. | 1 hr. | 3 hr. | 5 hr. | 23 hr. |
| $(NH_4)_2CO_3$ | 1.2 | $9 \times 10^5$ | $3 \times 10^5$ | $6 \times 10^4$ | $2 \times 10^4$ | $2 \times 10^2$ |
| $(NH_4)_2HPO_4$ | 1.3 | $8 \times 10^5$ | $4 \times 10^5$ | $7 \times 10^4$ | $8 \times 10^3$ | 0 |
| $NH_4Cl$ | $8 \times 10^5$ | 1.3 | $3 \times 10^5$ | $3 \times 10^4$ | $2 \times 10^3$ | 0 |
| $NH_4Br$ | 1.3 | $1 \times 10^6$ | $8 \times 10^4$ | $2 \times 10^3$ | $7 \times 10^2$ | 0 |

EXAMPLE 7

The efficacy of active biocidal ingredients derived from various ammonium salts against Bacillus in carbonate buffer, pH of the media 10.0 (initial viable count: $4 \times 10^6$ cfu/ml) was tested as follows:

TABLE 7

| Ammonium Salt | Dosage ppm expressed as $Cl_2$ | Viable Count cfu/ml after | | | | |
|---|---|---|---|---|---|---|
| | | 1 min. | 1 hr. | 3 hr. | 5 hr. | 23 hr. |
| $(NH_4)_2HPO_4$ | 2.25 | $9 \times 10^5$ | $6 \times 10^5$ | $3 \times 10^5$ | $4 \times 10^5$ | $2 \times 10^4$ |
| $NH_4Cl$ | 2.25 | $9 \times 10^5$ | $4 \times 10^5$ | $2 \times 10^5$ | $2 \times 10^5$ | $1 \times 10^4$ |
| $NH_4Br$ | 2.25 | $1 \times 10^6$ | $6 \times 10^5$ | $2 \times 10^5$ | $2 \times 10^5$ | $2 \cdot 10^3$ |

EXAMPLE 8

Control of mixed cultures of microorganisms in a 2% sizing keto suspension. The pH of the media was 5.5.

TABLE 8

| Ammonium Salt | Dosage Expressed as ppm $Cl_2$ | Viable Count cfu/ml after 6 hours |
|---|---|---|
| $(NH_4)_2CO_3$ | 9.5 | $3 \times 10^2$ |
| $NH_4Br$ | 9.5 | $7 \times 10^3$ |

EXAMPLE 9

Control of Legionella Pneumophila in a cooling tower:

The cooling tower was operated with soft water (see water analysis below). The system was treated with phosphonate-polyacrylate as a corrosion inhibitor. Microbial analysis of the cooling water: total aerobic count: $2 \times 10^5$ cfu/ml; total anaerobic count: $9 \times 10^3$ cfu/ml Legionella Pneumophila: $9 \times 10^3$ cfu/ml. The deck and basin of the cooling tower were covered with algae.

The cooling tower was shock dosed with the active biocidal ingredient formed with ammonium sulfate and sodium hypochlorite. The quantity 90 ppm (expressed as $Cl_2$) of the active biocidal ingredient were added to the cooling water during 30 minutes, and was left in the water for an additional hour.

The microbial population of the cooling tower, monitored 49 hours after the shock treatment, revealed a total aerobic count of 10 cfu/ml, and Legionella Pneumophila was not detected in the water following shock treatment.

TABLE 9

| Cooling Water Analysis: | Conductivity: 4080 $\mu s$ |
|---|---|
| | Ca: 87.0 ppm as $CaCO_3$ |
| | Cl: 830 ppm as Cl |
| | Si: 19 ppm |
| | P: 1.7 ppm as $PO_4$ |
| | pH: 8.8 |
| | Alkalinity: 590 ppm as $CaCO_3$ |
| | Fe: 2.5 ppm |

EXAMPLE 10

The efficacy of the active biocidal ingredient derived from various ammonium salts in a cooling water (pH 9.0) was tested as follows:

The water, taken from a cooling tower, contained a mixture of phosphonate and dispersant as scale and corrosion inhibitors. Water analysis: Ca:550 ppm as $CaCO_3$; total phosphate 25.0 ppm as $PO_4$; Si:43.0 ppm; Cl:390 ppm; alkalinity M-alkalinity:455 ppm; P-alkalinity:120 ppm. Conductivity:2580 $\mu s$.

TABLE 10

| Ammonium Salt | Dosage ppm expressed as $Cl_2$ | Viable Count 90 min. | cfu/ml after 18 h. |
|---|---|---|---|
| $(NH_4)_2CO_3$ | 6.0 | $1 \times 10^5$ | 0 |
| $(NH_4)_2HPO_4$ | 6.0 | $6 \times 10^4$ | 0 |
| $NH_4Br$ | 6.0 | $6 \times 10^2$ | 0 |
| Control | — | $1 \times 10^5$ | $3 \times 10^4$ |

EXAMPLE 11

A concentrated solution of the active biocidal ingredient was prepared from mixtures of ammonium bromide (152 gr/L) and ammonium sulfate (102.5 gr/L) at the listed molar ratio, and sodium hypochlorite. The rate of decomposition of the concentrated active biocidal ingredient was monitored as follows:

TABLE 11

| $SO_4/Br$ 3:1 | | $SO_4/Br$ 1:1 | | $SO_4/Br$ 1:3 | |
|---|---|---|---|---|---|
| Time | pH | Time | pH | Time | pH |
| 0 | 10.45 | 0 | 10.02 | 0 | 10.65 |
| 12 | 10.19 | 12 | 9.86 | 12 | 10.07 |
| 32 | 9.98 | 30 | 9.40 | 30 | 9.59 |
| 48 | 9.84 | 48 | 9.02 | 48 | 8.89 |

TABLE 11-continued

| | $SO_4/Br$ 3:1 | | $SO_4/Br$ 1:1 | | $SO_4/Br$ 1:3 | |
|---|---|---|---|---|---|---|
| Time | pH | Time | pH | Time | pH |
| 58 | 9.72 | 58 | 8.77 | 59 | 6.6 |
| 62 | 9.67 | 62 | 8.53 | 61 | 2.66 |
| 126 | 7.02 | 71 | 7.52 | 71 | 2.01 |

EXAMPLE 12

An active biocidal ingredient derived from sulfamic acid and NaOCl was prepared as follows: Sulfamic Acid: 13.7%; NaOCl: 7.2% expressed as $Cl_2$. Batch dilution factor: 1:20; continuous synchronous dilution factor: 1:14

By "batch dilution factor" is meant the volume ratio of both the volume of the chlorine source ($\approx$10% as $Cl_2$) and of the amine source (equimolar to chlorine) to the volume of water in the concentrated active ingredient. By "continuous synchronous dilution factor" is meant the volume ratio of both the chlorine source ($\approx$10% as $Cl_2$) and the amine source (equimolar to chlorine) to the volume of water in the continuous synchronous dilution process.

TABLE 12

Yield % of concentrated active biocidal ingredient derived from:

| | Sulfamic Acid (pH 7.73) | | | Sulfamic acid (pH 1.14) | | |
|---|---|---|---|---|---|---|
| t = | batch process | continuous process | pH of concentrate | batch process | continuous process | pH of concentrate |
| 0 | 100 | 100 | 12.23 | 100 | 100 | 11.50 |
| 30 m | 91.2 | 100 | 12.29 | — | 100 | 11.50 |
| 12 h | 77.8 | 102.1 | 12.14 | — | — | — |
| 20 h | 72.2 | 83 | 11.83 | 69.4 | 100 | 10.32 |

EXAMPLE 13

An active biocidal ingredient derived from Hydrazine hydrochloride and NaOCl was prepared as follows: Hydrazinium hydrochloride: 14.8% NaOCl: 7.2% expressed as $Cl_2$

TABLE 13

Yield % of concentrated active biocidal ingredient derived from:

| | Hydrazine HCl pH 0.0 | | | Hydrazine HCl + NaoH pH 7.60 | | |
|---|---|---|---|---|---|---|
| t = | batch process | continuous process | pH of concentrate | batch process | continuous process | pH of concentrate |
| t = 5 m | 19.44 | 24.0 | 0.32 | 8.33 | 100 | 8.20 |
| t = 24 h | 0 | 0 | 0 | 0 | 0 | 8.17 |

EXAMPLE 14

An active biocidal ingredient derived from $NH_4Br$ and $Ca(OCl)_2$ was prepared as follows: $Ca(OCl)_2$: 0.35% expressed as $Cl_2$ $NH_4Br$: 5% expressed as $Cl_2$ Concentrated active biocidal ingredient: 0.07 expressed as $Cl_2$ Continuous process dilution factor: 1:4.8

The following table sets forth the yield (%) of the active biocidal ingredient.

TABLE 14

| t = | Batch process | Continuous process | pH of concentrate |
|---|---|---|---|
| 5 min. | 10% | 60% | 9.08 |

EXAMPLE 15

An active biocidal ingredient derived from ammonium bromide mixed with Tween 20 (Polyoxyethylene Sorbitan Monolaurate) and NaOCl was prepared as follows: Amine source: $NH_4Br$ (14%) mixed in Tween 20 (1.4%). NaOCl: 8% expressed as $Cl_2$ Concentrated active biocidal ingredient: 0.6% expressed as $Cl_2$. Continuous process: dilution factor 1:13.3; $N/Cl_2$ 1:1 Batch process: dilution factor 1:20; 0.4% expressed as $Cl_2$ Molar ratio $N:Cl_2=2.1$ The following table sets forth the yield (%) of the active biocidal ingredient.

TABLE 15

| t = | Batch process | Continuous process | Concentrate pH |
|---|---|---|---|
| 5 min | 12.5 | 100 | 8.90 |
| 10 min | — | 51.6 | 6.60 |

EXAMPLE 16

An active biocidal ingredient derived from ammonium hydroxide and NaOCl was prepared as follows: $NH_4OH$: 2.4% NaOCl: 11.5% expressed as $Cl_2$ Continuous process: dilution factor: 1:10. Molar ratio $N/Cl_2$: 1.3:1.0. Concentrated active biocidal ingredient: 1.15% expressed as $Cl_2$ Batch process: dilution factor: 1:20; molar ratio $N/Cl_2=2:1$.

The following table sets forth the yield (%) of the active biocidal ingredient.

TABLE 16

| t = | Batch process | Continuous process | Concentrate pH |
|---|---|---|---|
| 1 min | 85 | 91.3 | 13.03 |
| 9 min | — | 75.4 | 13.03 |
| 15 min | — | 71.4 | 13.03 |
| 24 h | — | 44.4 | 12.88 |

EXAMPLE 17

An active biocidal ingredient derived from ammonium hydroxide mixed with SDS, and NaOCl was prepared as follows: Amine source: $NH_4OH$ (2.4%) in SDS (sodium dodecyl sulfate, 0.8%. pH: 10.71). NaOCl: 11.5% expressed as $Cl_2$. Continuous process: dilution factor 1:13.3; molar ratio $N/Cl_2$: 1.5:1.0 Concentrated active biocidal ingredient: 0.86% expressed as $Cl_2$. Batch production: dilution factor 1:20; molar ratio $N/Cl_2$: 2:1.

The following table sets forth the yield (%) of the active biocidal ingredient.

TABLE 17

| t = | Batch process | Continuous process | Concentrate pH |
|---|---|---|---|
| 2 min | 72.4 | 111.3 | 13.00 |
| 18 h | 0 | 51.16 | 13.00 |

EXAMPLE 8

An active biocidal ingredient derived from ammonium bromide and Acumer 2000 (a polyacrylate based dispersant, product of Rohm and Haas) was prepared as follows: Amine source: NH$_4$Br (14%) mixed with Acumer 2000 (20%). (Initial pH of the amine source was 4.15; NaOH was added gradually to the amine source.) Measurements of the residual active biocidal ingredient were conducted 2 minutes after production and showed the following yields (%); depending on pH of the concentrated active ingredient:

TABLE 18

| Batch process | Continuous process | pH of concentrated active ingredient | t (min) to decomposition |
|---|---|---|---|
| 0 | 4.42 | 5.12 | <1 m |
| 0 | 100 | 7.47 | 3 m |
| 0 | 100 | 7.75 | 6 min |
| 0 | 100 | 9.13 | 15 min |

While the invention has been described with respect to many preferred embodiments, it will be appreciated that these are set forth for purposes of example, and that many other variations, modifications and applications of the invention may be made.

I claim:

1. A method of treating a liquid to inhibit growth of living organisms therein by adding to the liquid an active biocidal ingredient formed by mixing an oxidant comprising hypochlorite and an amine source comprising ammonium bromide, comprising:

producing a predetermined dilution of said oxidant;

producing a predetermined dilution of said amine source;

synchronously metering said two dilutions into a conduit to continuously mix therein according to a predetermined ratio to produce said active biocidal ingredient having an effective amount of reproducibility, stability and efficacy in situ in said conduit;

and continuously injecting said active biocidal ingredient, as it is produced in situ in said conduit, directly from said conduit into the liquid being treated.

2. The method according to claim 1, wherein said predetermined dilution of the oxidant is continuously produced immediately before it is synchronously metered into the conduit with said predetermined dilution of the amine source.

3. The method according to claim 2, wherein said predetermined dilution of the amine source is continuously produced immediately before it is synchronously metered into the conduit with said predetermined dilution of the oxidant.

4. The method according to claim 1, wherein said active biocidal ingredient, as produced in situ in said conduit, has a pH of at least 7.0 before being introduced into the liquid to be treated.

5. The method according to claim 4, wherein said active biocidal ingredient, as produced in situ in said conduit, has a pH of over 10.0 before being introduced into the liquid being treated.

6. The method according to either of claims 4 or 5, wherein the liquid being treated has a pH of 5–10.5 before said active biocidal ingredient is injected into it.

7. The method according to claim 6, wherein the liquid being treated has a pH of 7–9 before said active biocidal ingredient is injected into it.

8. The method according to claim 1, wherein said active biocidal ingredient, as produced in situ in said conduit, is injected into the liquid being treated to a concentration of 0.5–300 ppm expressed as chlorine.

9. The method according to claim 8, wherein said active biocidal ingredient, as produced in situ in said conduit, is injected into the liquid being treated to a concentration of 3–10 ppm expressed as chlorine.

10. The method according to claim 1, wherein said amine source contains a detergent, surfactant, water treatment chemical, or a base.

11. The method according to claim 1, wherein said amine source has a concentration of 0.1 to 50%.

12. The method according to claim 1, wherein said amine source has a concentration of 2.5 to 30% and is equimolar to Cl$_2$.

13. The method according to claim 1 wherein said diluted amine source has a concentration of 0.1 to 6.0% and is equimolar to diluted oxidant solutions.

14. The method according to claim 1, wherein said oxidant is selected from the group of sodium hypochlorite and calcium hypochlorite.

15. The method according to claim 1, wherein said oxidant is a solution of hypochlorite, and said amine source is a solution containing an excess of base corresponding to at least 10% NaOH.

16. The method according to claim 1, wherein a base is synchronously added to said amine source to stabilize the active biocidal ingredient.

17. The method according to claim 1, wherein said oxidant has a concentration of 0.1–15% expressed as Cl$_2$.

18. The method according to claim 17, wherein said oxidant has a concentration of 5–15% expressed as Cl$_2$.

19. The method according to claim 17, wherein said oxidant dilution has a concentration of 0.1 to 2.0% expressed as Cl$_2$.

20. A method of treating a liquid to inhibit growth of living organisms therein by adding to the liquid an active biocidal ingredient formed by mixing an oxidant comprising hypochlorite and an amine source comprising ammonium bromide, characterized in:

continuously and synchronously injecting a quantity of said oxidant into a first stream of water passing through a first conduit to produce therein a predetermined dilution of said oxidant;

continuously and synchronously injecting a quantity of said amine source into a second stream of water passing through a second conduit to produce therein a predetermined dilution of said amine source;

continuously and synchronously injecting said first and second streams into a third conduit according to a predetermined ratio to produce said active biocidal ingredient in situ in said third conduit;

and continuously injecting said active biocidal ingredient, as it is produced in situ in said third conduit, from said third conduit into the liquid being treated.

21. The method according to claim 20, wherein said oxidant is continuously injected into said first stream of water by a first dosing pump connected to a reservoir of said oxidant.

22. The method according to claim 21, wherein said amine source is continuously injected into said second stream of water by a second dosing pump connected to a reservoir of said amine source and synchronously operated with said first dosing pump.

23. Apparatus for treating a liquid to inhibit growth of living organisms therein by adding to the liquid an active biocidal ingredient formed by continuously and synchronously mixing an oxidant comprising hypochlorite and an amine source comprising amonium bromide, comprising:

(a) a first diluter producing a predetermined dilution of said oxidant;

(b) a second diluter producing a predetermined dilution of said amine source;

(c) a mixer continuously and synchronously mixing said two dilutions in a conduit according to a predetermined ratio to produce said active biocidal ingredient in situ in said conduit; and (d) an injector continuously injecting said active biocidal ingredient, as it is produced in situ in said conduit, directly from said conduit into the liquid being treated.

24. Apparatus according to claim 23, wherein:

said first diluter comprises a first conduit including a first dosing pump, connected to a reservoir of the oxidant for continuously pumping the oxidant into a first stream of water in proportion to the rate of flow of water through said first conduit;

said second diluter comprises a second conduit including a second dosing pump, connected to a reservoir of the amine source for continuously and synchronously pumping into a second stream of water a quantity of the amine source corresponding to the rate of flow of water through said second conduit; and said mixer comprises a third conduit connected to said first and second conduits to mix said two dilutions therein, to produce said active biocidal ingredient in situ in said third conduit as the active biocidal ingredient is continuously injected into the liquid being treated.

25. The apparatus according to claim 24, wherein said dosing pumps are venturi tubes conducting their respective streams of water.

26. The apparatus according to claim 25, wherein each of said first and second conduits includes a water control valve for controlling the flow rate of the water therethrough to their respective venturi tubes.

27. The apparatus according to claim 25, wherein the connection of each of said reservoirs to its respective venturi tube includes a dosage control valve for controlling the flow rate therethrough of the oxidant and amine source from their respective reservoirs to the respective venturi tubes.

28. The apparatus according to claim 24, wherein said dosing pumps are peristaltic pumps.

29. The apparatus according to claim 24, wherein said dosing pumps are pulsatile pumps.

30. The apparatus according to claim 24, including means for continuously filling each of said reservoirs in order to maintain a constant level therein.

31. The apparatus according to claim 24, wherein said third conduit includes an optical sensor for sensing the optical properties of the active biocidal ingredient formed in situ therein and flowing therethrough to the water being treated, and for controlling said dosage pumps in response to said sensed optical properties.

32. The apparatus according to claim 24, wherein said third conduit includes a pH sensor for sensing the pH of the active biocidal ingredient formed in situ therein and flowing therethrough to the water being treated, and for controlling said dosage pumps in response to the sensed pH.

* * * * *